US009927604B2

(12) United States Patent
Uyar et al.

(10) Patent No.: US 9,927,604 B2
(45) Date of Patent: Mar. 27, 2018

(54) BIOLOGICALLY INSPIRED ALGORITHM BASED METHOD FOR NEAR REAL-TIME TRACKING OF MOVING OBJECTS IN THREE DIMENSIONAL ENVIRONMENT

(71) Applicant: Research Foundation of the City University of New York, New York, NY (US)

(72) Inventors: M. Umit Uyar, New York, NY (US); Stephen Gundry, New York, NY (US)

(73) Assignee: Research Foundation of the City University of New York, New York, NY (US)

( * ) Notice: Subject to any disclaimer, the term of this patent is extended or adjusted under 35 U.S.C. 154(b) by 353 days.

(21) Appl. No.: 14/853,460

(22) Filed: Sep. 14, 2015

(65) Prior Publication Data
US 2016/0077321 A1    Mar. 17, 2016

Related U.S. Application Data

(60) Provisional application No. 62/049,657, filed on Sep. 12, 2014.

(51) Int. Cl.
| | |
|---|---|
| *G06K 9/00* | (2006.01) |
| *G02B 21/24* | (2006.01) |
| *G02B 21/36* | (2006.01) |
| *G06K 9/32* | (2006.01) |

(52) U.S. Cl.
CPC ......... *G02B 21/241* (2013.01); *G02B 21/365* (2013.01); *G06K 9/00127* (2013.01); *G06K 2009/3291* (2013.01)

(58) Field of Classification Search
CPC .............................................. G06K 2017/0045
USPC ........................................................... 348/79
See application file for complete search history.

(56) References Cited

U.S. PATENT DOCUMENTS

| | | | |
|---|---|---|---|
| 6,905,831 B2 | 6/2005 | Jiang et al. | |
| 2011/0238322 A1 | 9/2011 | Song | |
| 2016/0174902 A1* | 6/2016 | Georgescu | ................ G06T 7/73 600/408 |

OTHER PUBLICATIONS

Dogan et al.; Testbed Implementation of Genetic Algorithms for Self Spreading Nodes in MANETs.; Research Gate; Jan. 2008; City University of New York.; New York US.
Dogan et al; Testbed for Node Communication in MANETs to Uniformly Cover Unknown Geographical Terrain Using Genetic Algorithms; Adaptive Hardware and Systems, 2009. AHS 2009. NASA/ESA Conference on Adaptive Hardware and Systems; Jul. 29, 2009; pp. 273-280; IEEE.

(Continued)

*Primary Examiner* — Jeffery Williams
(74) *Attorney, Agent, or Firm* — Peter J. Mikesell; Schmeiser, Olsen & Watts, LLP

(57) ABSTRACT

A method for tracking three-dimensional movement of an object and focusing thereon is provided. Software repeatedly detects three-dimensional locations of one or more objects and image quality by sampling images at many parameter settings as the objects move in three-dimensional environment. The images are ranked occurring to a fitness score and parameter settings for subsequent images to established using a biologically-inspired algorithm.

19 Claims, 6 Drawing Sheets

(56) References Cited

OTHER PUBLICATIONS

Gundry et al; Differential Evolution-Based Autonomous and Disruption Tolerant Vehicular Self-Organization in MANETs; Science Direct; Feb. 2015; pp. 454-471; vol. 25, Part B; Elsevier B.V.
Sahin et al; Genetic Algorithms for Self-Spreading Nodes in MANETs; GECCO '08 Proceedings of the 10th annual conference on Genetic and evolutionary computation; Jul. 13, 2008; pp. 1141-1142; ACM New York, NY, USA.
Urrea et al; Bio-inspired topology control for knowledge sharing mobile agents; Science Direct; pp. 677-689; Apr. 11, 2008; Elsevier B.V.

* cited by examiner

| Microscope Magnification Level | Microscope Exposure Time | Microscope Gain Value | Microscope Navigation Position - X | Microscope Navigation Position - Y | Microscope Navigation Position - Z |
|---|---|---|---|---|---|

FIG. 5

Generation 1, Individual 1

| 20 | 6 | 1.4 | -3.72 | -0.8 | 3910 |

Fitness = 319,958

Generation 1, Individual 2

| 20 | 6 | 1.4 | -3.54 | -0.75 | 3993 |

Fitness = 268,663

Generation 1, Individual 3
(selected as parent for next generation)

| 20 | 6 | 1.4 | -3.53 | -0.78 | 3894 |

Fitness = 357,598

Generation 1, Individual 4
(selected as parent for next generation)

| 20 | 6 | 1.4 | -3.71 | -0.82 | 3893 |

Fitness = 340,612

Generation 2, Individual 1 (Parent)

| 20 | 6 | 1.4 | -3.53 | -0.78 | 3894 |

Fitness = 357,598

Generation 2, Individual 2 (Parent)

| 20 | 6 | 1.4 | -3.71 | -0.82 | 3893 |

Fitness = 340,612

Generation 2, Individual 3 (Child)

| 20 | 6 | 1.4 | -3.51 | -0.7 | 3897 |

Fitness = 296,972

Generation 2, Individual 4 (Child)

| 20 | 6 | 1.4 | -3.53 | -0.74 | 3891 |

Fitness = 439,666

US 9,927,604 B2

BIOLOGICALLY INSPIRED ALGORITHM BASED METHOD FOR NEAR REAL-TIME TRACKING OF MOVING OBJECTS IN THREE DIMENSIONAL ENVIRONMENT

CROSS-REFERENCE TO RELATED APPLICATIONS

This application claims priority to and is a non-provisional of U.S. Patent Application Ser. No. 62/049,657 (filed Sep. 12, 2014) the entirety of which is incorporated herein by reference.

STATEMENT OF FEDERALLY SPONSORED RESEARCH OR DEVELOPMENT

This invention was made with government support under contract no. 1265265 awarded by the National Science Foundation (NSF). The government has certain rights in the invention.

BACKGROUND OF THE INVENTION

Current methods for tracking three-dimensional structures and capturing their images using even the most advanced systems require substantial human effort, both in terms of time and skill, are prone to operator error and lack uniformity. These shortcomings of the data acquisition activity limit the effectiveness and efficiency of the outcomes severely. For example, in developing bright-field images, the operator collects images at pre-determined time points (e.g., every 48 hours) and analyzes them visually to make comparative determinations. The experimenter observes the objects, chooses targets within a region of interest, and focuses the device on the vertical plane desired. In addition to a significant human presence, this process requires manually tracking and re-focusing the microscope possibly hundreds of times at each session. New and different positioning of the microscope and levels of focus are needed as the morphology and shape related changes over time. In FIG. 1, an example for the need in tracking and re-focusing a microscope is illustrated. A cluster of cancer cells of the breast cancer cell line MCF7 is shown in the left-most pane in FIG. 1. As in typical experiments conducted in cancer biology, the MCF7 cells were placed into a three-dimensional matrigel to be observed over time. The middle pane displays the cells after 5 hours, at which time this cluster moved within the matrigel and became slightly blurred. After 10 hours, as shown in the right-most pane in FIG. 1, the microscope lost its focus on this cell cluster. In addition, the cell cluster moved out of the center of the field of view. Hence, a microscope guiding system to automatically track the location of this cell cluster and keep its image on microscope on focus will be beneficial to the practitioners of such biology experiments.

Unfortunately, the tracking and auto-focus features of even the most modern information capturing devices cannot alleviate the manual operator input in focusing in a three-dimensional environment. As of today, there are no commercially available software packages for efficient tracking and auto-focusing of three-dimensional structures. For example, a current microscope from General Electric (GE) uses the autofocus feature which is very limited. In this example, the microscope set the focal plane at the brightest point in a well full of biological material. This may not necessarily be the best focal plane since most of the material may have less brightness but containing the most useful information. The discussion above is merely provided for general background information and is not intended to be used as an aid in determining the scope of the claimed subject matter.

BRIEF DESCRIPTION OF THE INVENTION

A method for tracking movement of an object and focusing thereon is provided in a three-dimensional environment. Software repeatedly detects three-dimensional locations of one or more objects and image quality by sampling images at many parameter settings as the objects move in three-dimensional environment. The images are ranked occurring to a fitness score and parameter settings for subsequent images to be established using a biologically-inspired algorithm. An advantage that may be realized in the practice of some disclosed embodiments of the method is that an image capturing device, such as a microscope or telescope, can automatically track and focus on an object as it moves in a three-dimensional environment despite such image capturing devices having numerous (e.g. hundreds of millions) of possible combinations of parameter settings (e.g. three dimensional location coordinates, light intensity levels, different exposure durations, focusing parameters, etc.).

In a first embodiment, a method for tracking three-dimensional movement of an object and focusing thereon is provided. The method comprising steps of: obtaining, with an information capturing device, multiple captures of information of an object, the information capturing device having both a field of view and multiple parameter settings, wherein the multiple capture of information are obtained at a corresponding number of different parameter settings; analyzing, with a computer, each capture of information to locate the object in the field of view and to obtain corresponding information metrics for each capture of information; assigning each capture of information a fitness score based on the corresponding information metric; ranking the fitness scores of the multiple captures of information to identify at least two captures of information with the highest fitness scores; constructing a second generation of parameter settings using a biologically-inspired algorithm based on the at least two captures of information identified in the step of ranking, wherein at least half of the multiple captures of information are omitted from the at least two captures of information; adjusting the information capturing device to the second generation of parameter settings, including adjusting a position of the information capturing device to track the object in the field of view as the object moves in three-dimensional environment; repeating the method at least once with the second generation of parameter settings.

In a second embodiment, a program storage device readable by machine, tangibly embodying a program of instructions executable by machine to perform method steps for tracking three-dimensional movement of an object and focusing thereon is provided. The method comprising the steps of: obtaining, with an information capturing device, multiple captures of information of an object, the information capturing device having both a field of view and multiple parameter settings, wherein the multiple capture of information are obtained at a corresponding number of different parameter settings; analyzing, with a computer, each capture of information to locate the object in the field of view and to obtain corresponding information metrics for each capture of information; assigning each capture of information a fitness score based on the corresponding information metric; ranking the fitness scores of the multiple captures of information to identify at least two captures of information with the highest fitness scores; constructing a second generation of parameter settings using a biologically-inspired algorithm based on the at least two captures of information identified in the step of ranking, wherein at least half of the multiple captures of information are omitted from the at least two captures of information; adjusting the information capturing device to the second generation of parameter settings, including adjusting a position of the information capturing device to track the object in the field of view as the object moves in three-dimensional environment; repeating the method at least once with the second generation of parameter settings.

In a third embodiment, a method for tracking three-dimensional movement of an object and focusing thereon is provided. The method comprising steps of: obtaining, with an optical microscope, multiple digital images of an object, the optical microscope having both a field of view and multiple parameter settings, wherein the multiple digital images are obtained at a corresponding number of different parameter settings; analyzing, with a computer, each digital image to locate the object in the field of view and to obtain corresponding information metrics for each digital image; assigning each digital image a fitness score based on the corresponding information metric; ranking the fitness scores of the multiple digital images to identify at least two digital images with the highest fitness scores; constructing a second generation of parameter settings using a biologically-inspired algorithm based on the at least two digital images identified in the step of ranking, wherein at least half of the multiple digital images are omitted from the at least two digital images; adjusting the optical microscope to the second generation of parameter settings, including adjusting a position of the optical microscope to track the object in the field of view as the object moves in three-dimensional environment; repeating the method at least once with the second generation of parameter settings.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 5. Example chromosome structure for a GA based BICT. Exposure time is measured in milliseconds and microscope positions for X and Y coordinates are in millimeters, and z in micrometers;

DETAILED DESCRIPTION OF THE INVENTION

Figure 1:
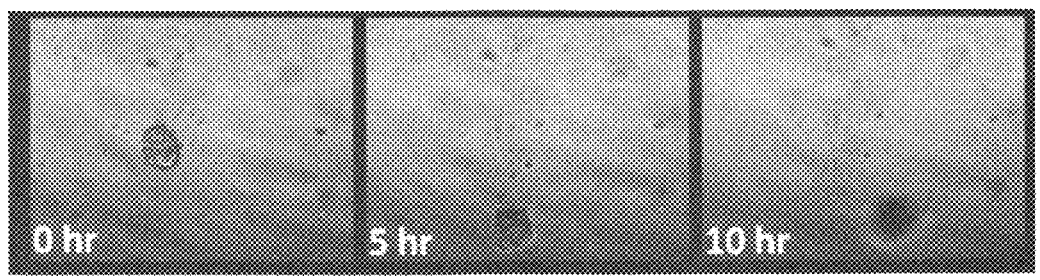
FIG. 1. An example of imaging cell clusters of breast cancer cell line MCF7 in a three-dimensional culture with existing technology. Here, tumor cells move resulting in a loss of focus after several hours.

Disclosed in this specification is a method to evaluate and track images of objects moving in three-dimensional environment in near real-time. Briefly, software detects the location of one or more objects by sampling images at many locations and evaluating their image descriptors. In the detection of images, software evaluates many candidate images with respect to their qualifications such as sharpness, brightness, Chebyshev, Fourier, Wavelet, and moment analyses. During an observation session such as a biological experiment or continuously tracking a satellite, the software keeps evaluating and capturing these images of the objects in near real-time as the objects move in three-dimensional environment. In one embodiment, an information capturing device is used to capture a first capture of information. Examples of information captures devices include digital cameras, microscopes such as optical microscopes, telescopes and the like. Examples of first captures of information include digital images. For example, an information capturing device may capture a first capture of information of an object such as a distant cluster of large stars in outer space or a nearby cluster of small objects observed in an underwater environment. As used in this specification, the phrase "near real-time" refers to an event occurring within the time used by the image capture device to respond to new input parameters (e.g. coordinates to move the field of view, change the gain of the microscope, exposure time, etc.) to change its image capturing capability. For example, an optical microscope may take less than a few hundred milliseconds (e.g. less than 200 milliseconds) to readjust to new focusing and/or tracking parameters. In contrast, a telescope may take longer.

Once located, a first set of information metrics is obtained. One example of a first set of information metrics is a bright-field and fluorescent images of each object in the cluster of small objects.

Thereafter the information from each image is quantified. The method steps may be repeated over a predetermined period of time at a predetermined interval. Also these steps may be repeated indefinitely to provide near real-time quantified data suitable to the purpose of the experiment or an observational session. The quantified data may then be evaluated over the predetermined period of time to provide a data concerning the morphological shape related changes and/or movements of objects over time.

A method based on biologically inspired (or, bio-inspired) computational techniques (BICTs) is disclosed for near real-time tracking of moving objects in three-dimensional environment. Examples of BICTs include genetic algorithms (GAs), particle swarm optimization algorithms (PSO), and differential evolution (DE) algorithms.

The search space for tracking objects and capturing images can be infeasibly large. For example, for typical microscopes used in cancer biology experiments, the number of possibilities for different positions where a cell cluster can be located, together with different intensity levels and different exposure durations of a typical microscope, can be easily in the order of hundreds of millions.

BICTs are general purpose algorithms that mimic powerful mechanisms from nature such as the natural evolution of species or the collective intelligence of animals with the goal of solving complex optimization problems. These algorithms may be incorporated into a telescope or any other imaging and observation device to guide the device to automatically focus and track in near real-time hundreds of times with no (or minimal) manual intervention over the course of an observation session.

BICTs use a so-called fitness function to quantify the optimality (i.e., goodness) of a solution ("chromosome") and rank it against all the other chromosomes. New chromosome structures and fitness function(s) are built to evaluate the information extracted from microscope captured images. The disclosed BICTs heuristically analyze the captured images of objects and evaluate their fitness based on many criteria including image sharpness (e.g., difference in brightness of adjacent pixels, etc.). The disclosed BICTs then evolve to new populations where individuals have better fitness (e.g., focus) than the previous generations. If GA is chosen as the BICT, the GA, its chromosome structures and its fitness function(s) using a software testbed. In this framework, the chromosomes of an individual are converted into location tracking and focus commands for an image capturing device such as a telescope which then generates an image representing this individual. At each generation of the BICT, only the fitter individuals with better image quality and focus survive, whereas lower quality and/or out-of-focus individuals will be dropped from the population. Using this so-called elitist approach in the disclosed method, BICT converges towards a precise location and a high quality image of the object. Similarly, if PSO is chosen to realize the image evaluation method, the same chromosome structures and fitness function defined for GA implementation can be used. Also, if DE is chosen to realize the image evaluation method, the same chromosome structure and the fitness function defined for the GA implementation can be used. The main differences among these BICTs are the mechanisms such as mutation, reproduction and selection operations used to form the new generations of individuals.

Figure 2:
FIG. 2. Node spreading using IROBOTS™ controlled by GUMSTIX™ processors.
Figure 3:
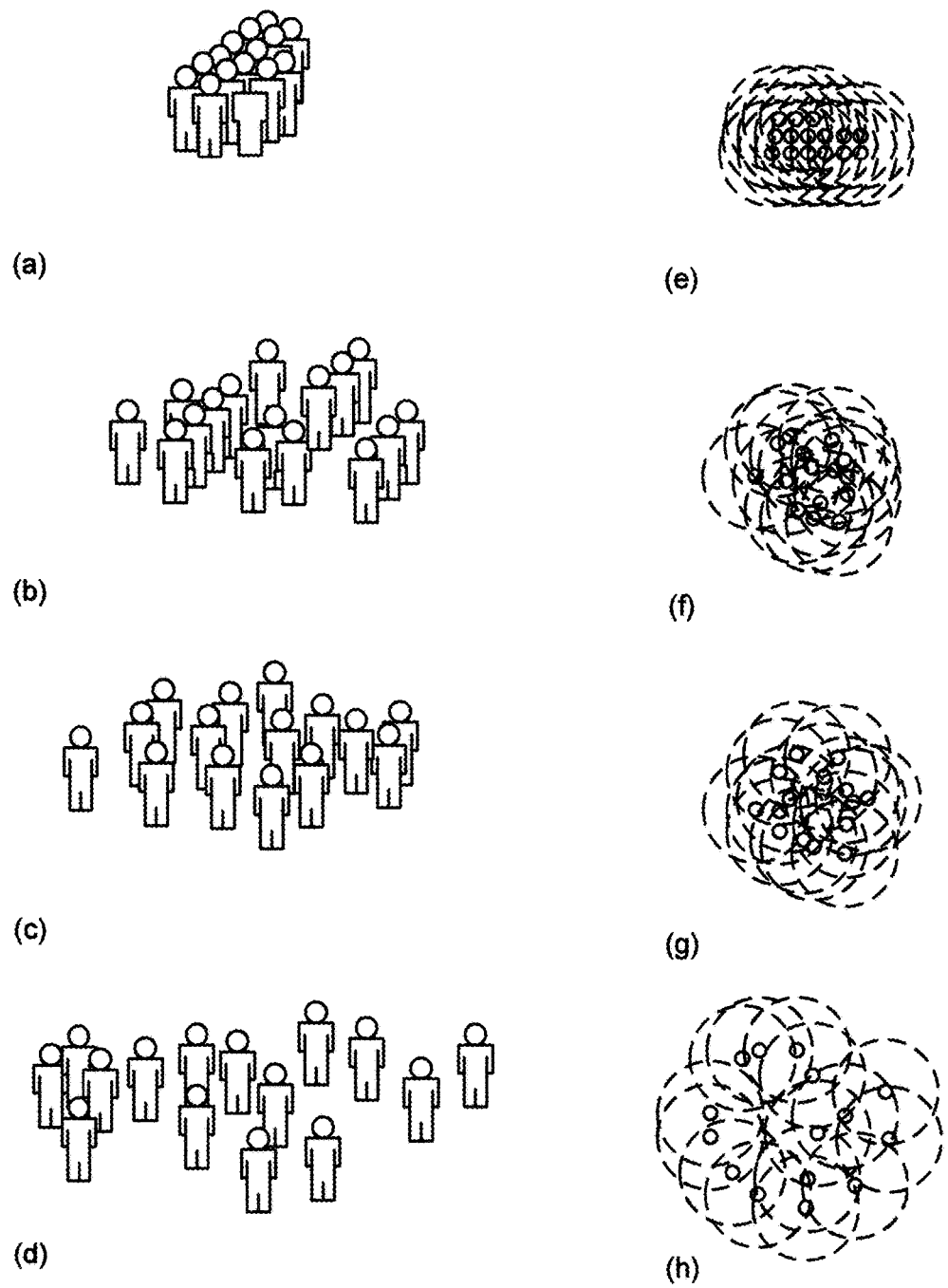
FIG. 3. Testbed implementation of differential evolution for topology control using laptops: (a) initial positions, (b) 5 steps, (c) 10 steps, and (d) 30 steps (left panels are laptop positions, right panels are the corresponding GPS positions for the laptops) and (e), (f), (g) and (h) are corresponding top views.

BICTs premise on the evolutionary ideas of natural selection and search for the best individuals within a population as the algorithm evolves toward the fittest solution or optimum result in an entire problem space. Several test beds have been developed to study the design and convergence properties of various GA-based topology control mechanisms, using different technologies and components (FIG. 2 and FIG. 3). See, for example, (1) Dogan, C., C. S. Sahin, et al. (2009). Testbed for node communication in MANETs to uniformly cover unknown geographical terrain using genetic algorithms. Proceedings of The NASA/ESA Conference on Adaptive Hardware and Systems (pp. 273-280); (2) Dogan, C., M. U. Uyar, et al. (2008). Testbed Implementation of Genetic Algorithms for Self Spreading Nodes in MANETs. Proceedings of 2008 Genetic Methods Conference (pp. 10-16). (3) Sahin, C. S., U. Urrea, et al. (2008). Genetic algorithms for self-spreading nodes in MANETs. In GECCO '08: Proceedings of the 10th annual conference on Genetic and evolutionary computation, New York, USA, ACM.; (4) Urrea, E., C. S. Sahin, et al. (2009). "Bio-inspired topology control for knowledge sharing mobile agents." Ad Hoc Netw. 7(4): 677-689. (5) S. Gundry, J. Zou, M. U. Uyar, C. S. Sahin, J. Kusyk, "Differential evolution-based autonomous and disruption tolerant vehicular self-organization in MANETs," Ad Hoc Netw., Elsevier, V. 25, pp. 454-471, 2015.

In this framework, each mobile node runs a GA to decide its next speed and movement direction based on its current local information to obtain a uniform distribution.

In the disclosed method, a chromosome represents a set of information describing a set of inputs and/or commands and/or similar device settings for an image capturing device. A chromosome can contain information such as, but not limited to, the horizontal, vertical, and depth position inputs for capturing an image, filter selection parameters such as wavelength, bandwidth region, and dichromatic mirror cut-on wavelength, and/or brightness level of an image capturing device such as a telescope, a microscope or a digital camera. The fitness (i.e. goodness) of the captured image is determined by a collection of image characteristics found using several metrics such as, but not limited to, brightness, sharpness, Chebyshev, Fourier, Wavelet, and moment analyses. As opposed to typical machine learning algorithms, the disclosed BICT based method does not require a training set of data to evaluate chromosomes. Rather, it efficiently searches through possible input settings of an image capturing device described by a chromosome to heuristically and iteratively determine the location of objects of interest and the quality of their images, and hence allows for the tracking and capture of high quality images.

The goodness of an image is determined based on the application. For example, for a given application, the better images may have higher values of Chebyshev function evaluations over their bit representations which correspond to a situation where smooth images are preferred over sharp images. In another application, the better images may have a lower value of Fourier function evaluation of their bit representations, corresponding to lower levels of variations brightness between adjacent pixels as opposed to the pictures with many fluctuations of brightness in their pixels.

Based on the chromosome structure, the disclosed method sets up the image capturing device settings including filters, focus levels, intensity settings over the three-dimensional space for capturing high quality potential images of objects of interest. The BICT based method creates the initial population of chromosomes to be further heuristically evolved. The software then evaluates the potential images of interest at various device settings dictated by the chromosomes of individuals. For example, images are captured at various locations using different combinations of microscope settings. Over a given period of time or continuously, the software can repeat the process as much as needed to adjust for the movements of the objects of interest within the entire region of interest in near real-time.

In one embodiment, the method is used to detect unexpected movement of an object in a three-dimensional environment. For example, a satellite may be tracked over months or years such that its location is checked at a regular interval (e.g. once per day, once per week, once per month, etc.). If a drift in the position of the satellite is detected, an alarm is triggered such that users may adjust for the drift in position. The method may be executed perpetually over the useful lifetime of the satellite.

Example Using GA

An example application of the BICT based method is a software implementation to guide microscope equipment for tracking location and maintaining focus on clusters of cancer cells placed to grow in a three-dimensional matrigel environment. This type of experiment may be useful for cancer biologists. Consider an experiment to accurately measure cell viability using this system, where colorectal cancer cells are cultured in matrigel and subjected to various cell death agents such as 5-FU for 48 hrs. The method may be executed at regular time intervals (e.g. once per minute, once per five minutes, once per hour, etc.).

Figure 4:
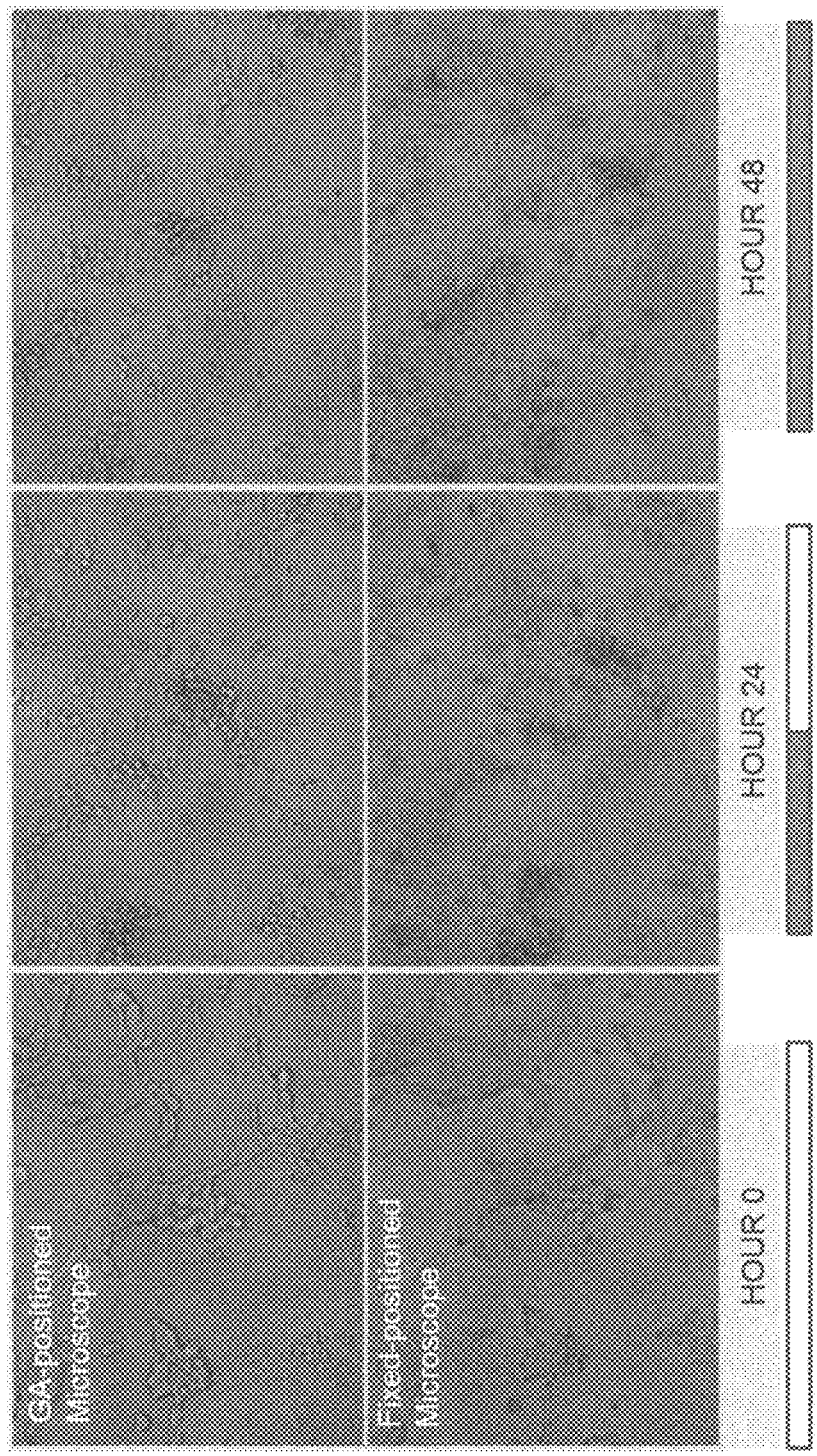
FIG. 4. Bright field microscope images of colorectal cancer cell cultures administered with 10 micromolar 5-FU drug. Top panel images are captured by microscope guided using our BICT based software, whereas the bottom panel images are the corresponding images taken at fixed positions without any guidance.

FIG. 4 depicts the bright field microscope images of colorectal cancer cell cultures administered with 10 micromolar of anti-cancer agent called 5-FU captured at the beginning, at the 24th hour and the 48th hour of the experiment. The top panel images of FIG. 4 are captured by microscope that was guided using the disclosed BICT based software, whereas the bottom panel images are the corresponding images taken at fixed positions without any guidance. In this example, our BICT based method is implemented as a GA. In this example, as shown in FIG. 5, the chromosome for the GA is defined such that it contains the location coordinates of the cell cluster in three dimensions as to be inputs to a light microscope, for example, its magnification level, exposure time, and gain. For simplicity, chromosome values for magnification level, exposure time and gain are set to their default values and have not been altered during the GA computations used in this example. The fitness function of the GA used for this example is defined as the sharpness level of the edges of the observed cell clusters in each candidate image. The sharpness level of the edges of an image can easily be calculated using the state of the art techniques in image processing. In this application, the fitness of an individual improves as the sharpness level of the image increases. Notice in FIG. 4 that the GA guided tool leads the microscope into positions such that the region of interest is at the center of the microscope vision (the top panel images in FIG. 4), whereas with a fixed positioned microscope the region of interest not only moves out of the center of the vision of the microscope but also goes out of focus since the cells move in matrigel during the experiment (the lower panel images in FIG. 4). The images shown at the top panel of FIG. 4 are the result of the location inputs to the microscope provided by the chromosomes of the GA, which selects the fittest individuals with centered and focused region of interest. Disclosed methodology results in both focused and centered images captured at each time point.

Figure 6:
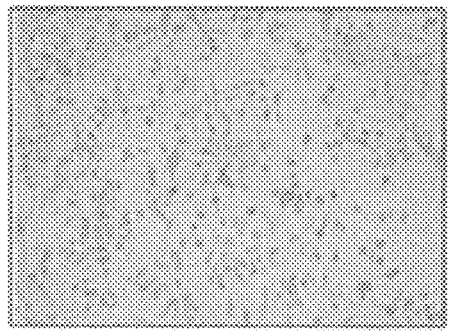
FIG. 6. GA population for generation 1 with their chromosomes and fitness values.
Figure 6:
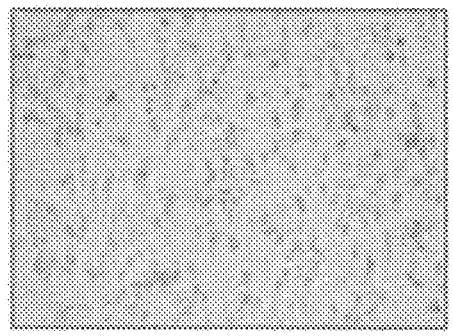
Figure 6:
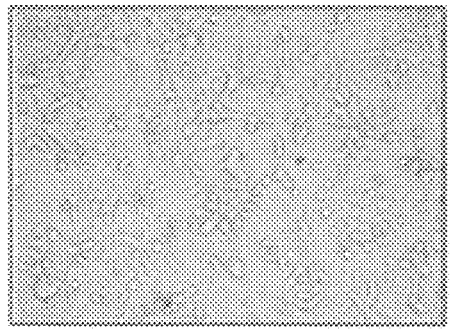
Figure 6:
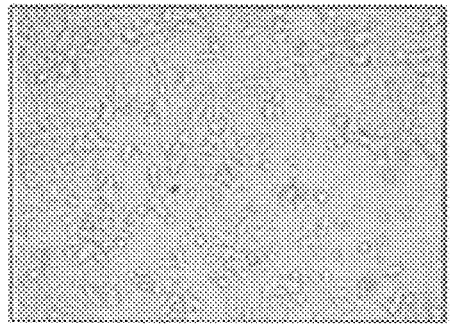
Figure 7:
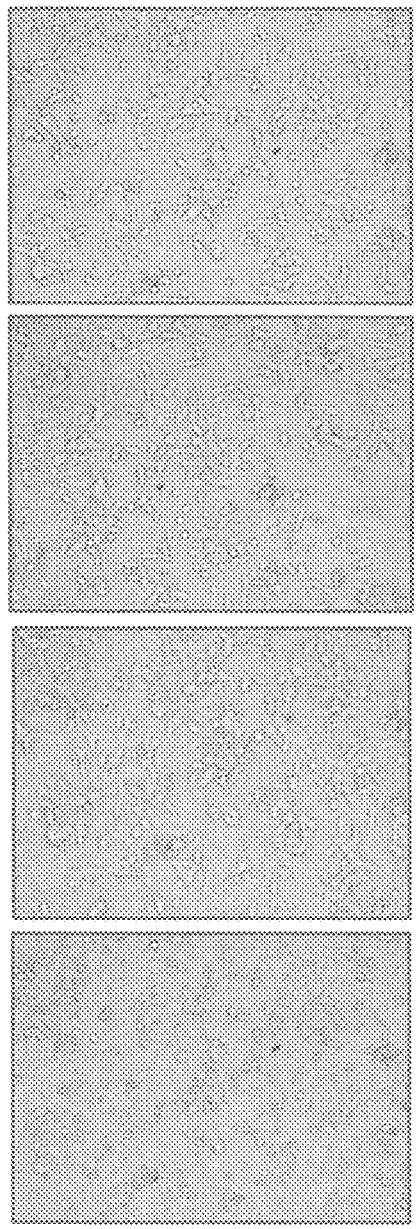
FIG. 7. GA population for generation 2 with their chromosomes and fitness values.

An example of how the GA operates in the frame of this disclosure is shown in FIG. 6 and FIG. 7, where cells from a colorectal cancer cell line are cultured in a micro incubator and placed into a three-dimensional matrigel environment in which living conditions are provided using gas and nutrition supplies at normal body temperature. The images shown in FIG. 6 and FIG. 7 are captured at the end of a 48-hour experiment. Only the location coordinates of the chromosomes are changed during the GA operations for simplicity. Microscope magnification level, exposure time and gain value are fixed as 20, 6 milliseconds, and 1.4, respectively.

To illustrate the evolution of the individuals in a GA based BICT, four members of the population from generation 1 are depicted in FIG. 6 together with their chromosomes and fitness values. For example, the image corresponding to individual 1 was taken at the incubator location measured by the microscope as −3.72 millimeter, −0.80 millimeter and 3910 micrometer, corresponding to the X, Y and Z coordinates, respectively. The fitness value for this individual is computed as 319,958 by using image sharpness formulation. Similarly, the chromosomes and their fitness values are shown for the remaining three individuals in generation 1. Using the elitist selection rule of GA, the fittest two individuals (i.e., individuals 3 and 4 in FIG. 6) are selected as parents to generate the offspring for the next generation. For brevity, how to generate the offspring from these two parents is not detailed in this specification. As shown in FIG. 7, these two parents and their two children form the population of generation 2. Among these individuals in generation 2, individual 4 has the best fitness, whereas individual 1 has the next best fitness. They will be selected as the parents for generation 3 of GA. This operation will be repeated for several generations until certain stopping criteria is satisfied, which is typically either when an upper limit of the number of generations is reached or the image quality satisfies certain conditions. In other applications, a typical biology experiment will use hundreds of individuals and will iterate up to several hundred generations.

Similar to GA case, other BICTs such as PSO, DE, or other evolutionary algorithms can also be implemented as part of disclosed method. The same chromosome and fitness function definitions can be employed for those techniques, where the selection of individuals for new generations and mutation techniques may differ.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon. Captured information may include but not limited to images, movies, and the like.

Any combination of one or more computer readable medium(s) may be utilized. The computer readable medium may be a non-transient computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the appended claims.

What is claimed is:

1. A method for tracking three-dimensional movement of an object and focusing thereon, the method comprising steps of:

obtaining, with an information capturing device, multiple captures of information of an object, the information capturing device having both a field of view and multiple parameter settings, wherein the multiple capture of information are obtained at a corresponding number of different parameter settings;

analyzing, with a computer, each capture of information to locate the object in the field of view and to obtain corresponding information metrics for each capture of information;

assigning each capture of information a fitness score based on the corresponding information metric;

ranking the fitness scores of the multiple captures of information to identify at least two captures of information with the highest fitness scores;

constructing a second generation of parameter settings using a biologically-inspired algorithm based on the at least two captures of information identified in the step of ranking, wherein at least half of the multiple captures of information are omitted from the at least two captures of information;

adjusting the information capturing device to the second generation of parameter settings, including adjusting a position of the information capturing device to track the object in the field of view as the object moves in three-dimensional environment;

repeating the method at least once with the second generation of parameter settings.

2. The method as recited in claim 1, wherein the information capturing device is an optical microscope and the first capture of information is a digital image.

3. The method as recited in claim 1, wherein the object is a biological cell.

4. The method as recited in claim 1, wherein the object is a biological cell and the step of repeating repeats at least twice within forty-eight hours.

5. The method as recited in claim 1, wherein the object is a biological cell and the step of repeating repeats at least once per hour for forty-eight hours.

6. The method as recited in claim 1, wherein the object is a biological cell in a three-dimensional cell culture and the object moves due to alterations in cell culture morphology.

7. The method as recited in claim 1, wherein the biologically-inspired algorithm is selected from the group consisting of a genetic algorithm, a particle swarm optimization algorithm, and a differential evolution algorithm.

8. The method as recited in claim 1, wherein the information capturing device is a telescope and the object is located outside of the Earth's atmosphere.

9. The method as recited in claim 1, wherein the multiple parameters settings include at least two parameter settings from the group consisting of sharpness, brightness, Chebyshev, Fourier, Wavelet, and moment analyses, three-dimensional location of the field of view.

10. A program storage device readable by machine, tangibly embodying a program of instructions executable by machine to perform method steps for tracking three-dimensional movement of an object and focusing thereon, the method comprising the steps of:

obtaining, with an information capturing device, multiple captures of information of an object, the information capturing device having both a field of view and multiple parameter settings, wherein the multiple capture of information are obtained at a corresponding number of different parameter settings;

analyzing, with a computer, each capture of information to locate the object in the field of view and to obtain corresponding information metrics for each capture of information;

assigning each capture of information a fitness score based on the corresponding information metric;

ranking the fitness scores of the multiple captures of information to identify at least two captures of information with the highest fitness scores;

constructing a second generation of parameter settings using a biologically-inspired algorithm based on the at least two captures of information identified in the step of ranking, wherein at least half of the multiple captures of information are omitted from the at least two captures of information;

adjusting the information capturing device to the second generation of parameter settings, including adjusting a position of the information capturing device to track the object in the field of view as the object moves in three-dimensional environment;

repeating the method at least once with the second generation of parameter settings.

11. The program storage device as recited in claim 10, wherein the information capturing device is an optical microscope and the first capture of information is a digital image.

12. The program storage device as recited in claim 10, wherein the object is a biological cell.

13. The program storage device as recited in claim 10, wherein the object is a biological cell and the step of repeating repeats at least twice within forty-eight hours.

14. The program storage device as recited in claim 10, wherein the object is a biological cell and the step of repeating repeats at least once per hour for forty-eight hours.

15. The program storage device as recited in claim 10, wherein the object is a biological cell in a three-dimensional cell culture and the object moves due to alterations in cell culture morphology.

16. The program storage device as recited in claim 10, wherein the biologically-inspired algorithm is selected from the group consisting of a genetic algorithm, a particle swarm optimization algorithm, and a differential evolution algorithm.

17. The program storage device as recited in claim 10, wherein the multiple parameters settings include at least two parameter settings from the group consisting of sharpness, brightness, Chebyshev, Fourier, Wavelet, and moment analyses.

18. The program storage device as recited in claim 10, wherein the information capturing device is a telescope and the object is located outside of the Earth's atmosphere.

19. A method for tracking three-dimensional movement of an object and focusing thereon, the method comprising steps of:

obtaining, with an optical microscope, multiple digital images of an object, the optical microscope having both a field of view and multiple parameter settings, wherein the multiple digital images are obtained at a corresponding number of different parameter settings;

analyzing, with a computer, each digital image to locate the object in the field of view and to obtain corresponding information metrics for each digital image;

assigning each digital image a fitness score based on the corresponding information metric;

ranking the fitness scores of the multiple digital images to identify at least two digital images with the highest fitness scores;

constructing a second generation of parameter settings using a biologically-inspired algorithm based on the at least two digital images identified in the step of ranking, wherein at least half of the multiple digital images are omitted from the at least two digital images;

adjusting the optical microscope to the second generation of parameter settings, including adjusting a position of the optical microscope to track the object in the field of view as the object moves in three-dimensional environment;

repeating the method at least once with the second generation of parameter settings.

* * * * *